(12) United States Patent
Yamagiwa et al.

(10) Patent No.: US 11,105,008 B2
(45) Date of Patent: Aug. 31, 2021

(54) ELECTROCHEMICAL REACTION DEVICE

(71) Applicant: KABUSHIKI KAISHA TOSHIBA, Minato-ku (JP)

(72) Inventors: Masakazu Yamagiwa, Yokohama (JP); Yuki Kudo, Yokohama (JP); Akihiko Ono, Kita (JP); Satoshi Mikoshiba, Yamato (JP); Jun Tamura, Chuo (JP); Ryota Kitagawa, Setagaya (JP); Yoshitsune Sugano, Kawasaki (JP); Eishi Tsutsumi, Kawasaki (JP); Asahi Motoshige, Ota (JP); Takayuki Tsukagoshi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 84 days.

(21) Appl. No.: 15/694,199

(22) Filed: Sep. 1, 2017

(65) Prior Publication Data

US 2018/0265994 A1 Sep. 20, 2018

(30) Foreign Application Priority Data

Mar. 16, 2017 (JP) .............................. JP2017-051308

(51) Int. Cl.
*C25B 1/04* (2021.01)
*C25B 11/031* (2021.01)
(Continued)

(52) U.S. Cl.
CPC .............. *C25B 11/031* (2021.01); *C25B 1/00* (2013.01); *C25B 1/04* (2013.01); *C25B 3/25* (2021.01);
(Continued)

(58) Field of Classification Search
CPC .... C25B 1/00; C25B 1/10; C25B 3/04; C25B 9/10; C25B 11/035; C25B 15/08; Y02E 60/366
See application file for complete search history.

(56) References Cited

U.S. PATENT DOCUMENTS 4,931,168 A 6/1990 Watanabe et al.
5,234,768 A 8/1993 Furuya
(Continued)

FOREIGN PATENT DOCUMENTS

EP 2 996 184 A1 3/2016
JP 6-31450 4/1994
(Continued)

OTHER PUBLICATIONS

Extended European Search Report dated Oct. 27, 2017 in European Patent Application No. 17189180.7.
(Continued)

*Primary Examiner* — Stefanie S Wittenberg
(74) *Attorney, Agent, or Firm* — Oblon, McClelland, Maier & Neustadt, L.L.P.

(57) ABSTRACT

A cathode part of an electrochemical reaction device comprises a conductor, a porous body, a reduction catalyst, an electrolytic solution flow path, a first flow path, and a second flow path. The conductor has a conductive surface. The porous body includes a first surface, a second surface, a first porous portion, and a second porous portion. The first surface is in contact with the conductive surface. A contact angle between an inner wall of the second porous portion and water is higher than a contact angle between an inner wall of the first porous portion and the water. The reduction catalyst is supported on the second surface to reduce carbon dioxide. The electrolytic solution flow path faces the reduction catalyst. The first flow path faces the first porous
(Continued)

portion. The second flow path faces the second porous portion.

8 Claims, 8 Drawing Sheets

(51) Int. Cl.
    *C25B 15/08* (2006.01)
    *C25B 1/00* (2021.01)
    *C25B 3/25* (2021.01)
    *C25B 9/23* (2021.01)
    *C25B 9/73* (2021.01)

(52) U.S. Cl.
    CPC .............. *C25B 9/23* (2021.01); *C25B 9/73* (2021.01); *C25B 15/08* (2013.01); *Y02E 60/36* (2013.01)

(56) References Cited

U.S. PATENT DOCUMENTS

| | | | |
|---|---|---|---|
| 5,972,196 A * | 10/1999 | Murphy | B01D 53/22 204/157.15 |
| 2007/0190401 A1 | 8/2007 | Ueda et al. | |
| 2008/0274390 A1 | 11/2008 | Ueda et al. | |
| 2009/0104499 A1 | 4/2009 | Sato et al. | |
| 2009/0136789 A1 | 5/2009 | Pien et al. | |
| 2009/0246565 A1 | 10/2009 | Hongo | |
| 2017/0073822 A1 | 3/2017 | Kudo et al. | |
| 2017/0183789 A1 * | 6/2017 | Matthews | C25B 9/08 |

FOREIGN PATENT DOCUMENTS

| | | |
|---|---|---|
| JP | 6-93485 | 4/1994 |
| JP | 7-118322 | 12/1995 |
| JP | 2009-80948 | 4/2009 |
| JP | 2010-205450 | 9/2010 |
| JP | 2012-122126 | 6/2012 |
| JP | 2017-53013 | 3/2017 |
| WO | WO 2016/037833 A1 | 3/2016 |

OTHER PUBLICATIONS

Antoni Forner-Cuenca et al. "Engineered Water Highways in Fuel Cells: Radiation Grafting of Gas Diffusion Layers", Advanced Materials, vol. 27, 2015, p. 6.

C.Z. Qin et al. "A new approach to modelling water flooding in a polymer electrolyte fuel cell", International Journal of Hydrogen Energy, vol. 40, 2015, p. 11.

Antoni Forner-Cuenca et al. "Advanced Water Management in PEFCs: Diffusion Layers with Patterned Wettability ", Journal of The Electrochemical Society, 163 (8), 2016, p. 14.

Antoni Forner-Cuenca et al. "Advanced Water Management in PEFCs: Diffusion Layers with Patterned Wettability ", Journal of The Electrochemical Society, 163 (9), 2016, p. 11.

A. Forner-Cuenca et al. "Advanced Water Management in PEFCs: Diffusion Layers with Patterned Wettability" , Journal of The Electrochemical Society, 163 (13), 2016, p. 10.

* cited by examiner

US 11,105,008 B2

ELECTROCHEMICAL REACTION DEVICE

CROSS REFERENCE TO RELATED APPLICATION

This application is based upon and claims the benefit of priority from Japanese Patent Application No. 2017-051308, filed on Mar. 16, 2017; the entire contents of which are incorporated herein by reference.

FIELD

Embodiments described herein relate generally to an electrochemical reaction device.

BACKGROUND

In recent years, from both viewpoints of an energy problem and an environment problem, it has become increasingly desirable not only to convert renewable energy such as sunlight into electric energy for immediate use, but also to convert it into a storable and movable state. To meet this demand, research and development in an artificial photosynthesis technology for producing chemical substances using the sunlight, similar to how plants photosynthesize, are in progress. This technology creates the possibility of storing the renewable energy as storable fuel. By producing chemical substances which become industrial raw materials, this technology also holds promise for creating value.

It has been know that one form of device in which the chemical substances are produced using renewable energy such as sunlight, an electrochemical reaction device, which includes a cathode for reducing carbon dioxide ($CO_2$) from, for example, a power plant and a waste treatment plant, and an anode for oxidizing water ($H_2O$). The cathode reduces carbon dioxide to produce a carbon compound such as carbon monoxide (CO), for example. When applying such an electrochemical reaction device into a cell format (also referred to as an electrolysis cell), it is considered effective to take the form of a fuel cell such as Polymer Electric Fuel Cell (PEFC), for example. However, this may lead to similar problems in a PEFC carrying over to the electrochemical reaction device.

DETAILED DESCRIPTION

An embodiment of an electrochemical reaction device of comprises: an anode part to oxidize water and thus produce oxygen; a cathode part to reduce carbon dioxide and thus produce a carbon compound and hydrogen; a separator separating the anode part and the cathode part; and a power supply connected to the anode part and the cathode part. The cathode part comprises: a conductor having a conductive surface; a porous body including a first surface, a second surface, a first porous portion, and a second porous portion, the first surface being in contact with the conductive surface, the first porous portion being in contact with at least one of the first surface or the second surface, the second porous portion being in contact with at least one of the first surface or the second surface, and a contact angle between an inner wall of the second porous portion and the water being higher than a contact angle between an inner wall of the first porous portion and the water; a reduction catalyst supported on the second surface to reduce carbon dioxide; an electrolytic solution flow path facing the reduction catalyst and provided to make an electrolytic solution containing the water flow; a first flow path facing the first porous portion and provided to discharge at least one of the water or water vapor from the first porous portion to an outside of the cathode part; and a second flow path facing the second porous portion and provided to make the carbon dioxide flow in the second porous portion from the outside of the cathode part and make at least one of the carbon compound or the hydrogen flow out to the outside of the cathode part from the second porous portion.

Hereinafter, embodiments will be described with reference to the drawings. Note that the drawings are schematic, and for example, sizes such as a thickness and a width of each component are sometimes different from actual sizes of the component. Further, in the embodiments, substantially the same components are denoted by the same reference signs, and a description is sometimes omitted.

Figure 1:
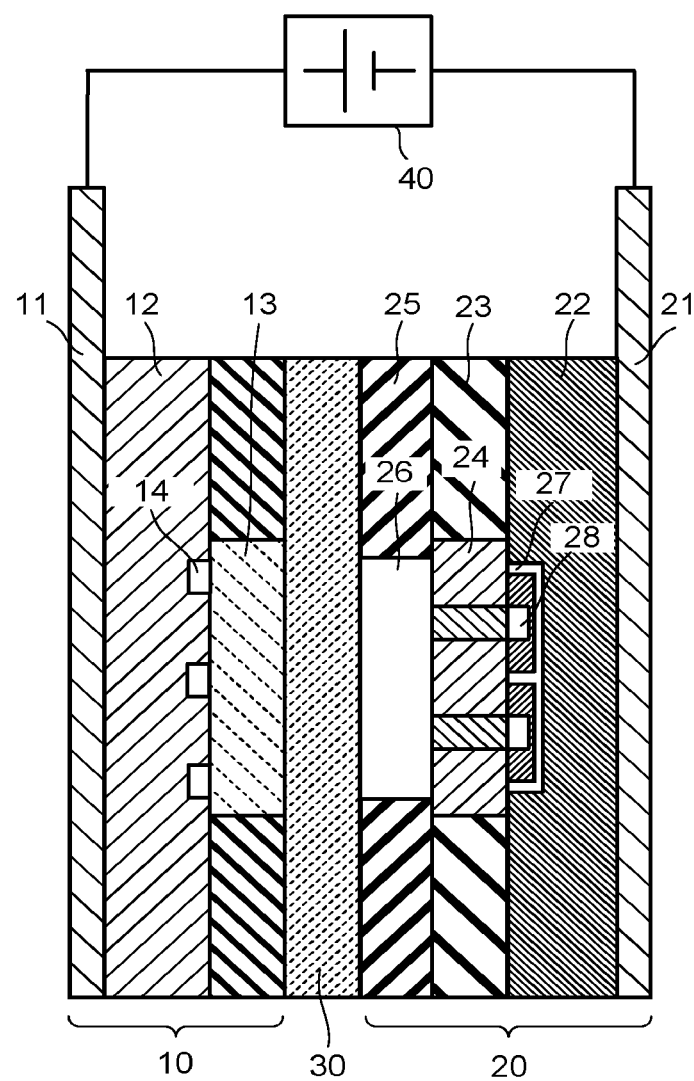
FIG. 1 is a schematic view illustrating a structure example of an electrochemical reaction device.

FIG. 1 is a schematic cross-sectional view illustrating a structure example of an electrochemical reaction device of an embodiment. The electrochemical reaction device includes an anode part 10, a cathode part 20, a separator 30, and a power supply 40.

The anode part 10 is capable of oxidizing water ($H_2O$) and producing oxygen and hydrogen ions, or oxidizing hydroxide ions ($OH^-$) and producing water and oxygen. The anode part 10 includes a current collector 11, an electric conductor 12, a porous body 13, and a flow path 14.

The current collector 11 is electrically connected to the power supply 40. The current collector 11 preferably contains a material having low chemical reactivity and high conductivity. Examples of this material include a metal material such as Ti or SUS, and carbon.

The electric conductor 12 is electrically connected to the current collector 11. The electric conductor 12 has grooves facing the porous body 13. The electric conductor 12 has a function as a flow path plate. As the electric conductor 12, it is preferable to use a material having low chemical reactivity and high conductivity. Examples of this material include a metal material such as Ti or SUS, and carbon.

The porous body 13 constitutes at least part of an anode. The porous body 13 has a function as a gas diffusion layer. The porous body 13 is provided with a base material having a porous structure, such as a mesh material, a punching material, a porous body, or a metal fiber sintered body, for example. The base material may be constituted of a metal such as titanium (Ti), nickel (Ni), or iron (Fe), or a metal material such as an alloy (for example, SUS) containing at least one of these metals.

The porous body 13 has an oxidation catalyst supported on a surface. Examples of the oxidation catalyst include metals such as platinum (Pt), palladium (Pd), and nickel (Ni), an alloy and an intermetallic compound containing the above metals, binary metal oxides such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), and a lanthanum oxide (La—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, metal complexes such as a Ru complex and a Fe complex, and the like.

The oxidation catalyst preferably adheres to or is stacked on a surface of the porous body 13 to form a catalyst layer. The oxidation catalyst preferably has nanoparticles, a nanostructure, a nanowire, or the like for the purpose of increasing an oxidation reaction. The nanostructure is a structure in which nanoscale irregularities are formed on a surface of a catalyst material.

The flow path 14 includes a space surrounded by the groove of the electric conductor 12 and the porous body 13. The flow path 14 has a function as an electrolytic solution flow path for making an electrolytic solution containing substances to be oxidized, such as water flow.

The cathode part 20 is capable of reducing carbon dioxide ($CO_2$) and producing a carbon compound and hydrogen. The cathode part 20 includes a current collector 21, an electric conductor 22, a support 23, a porous body 24, a flow path plate 25, a flow path 26, a flow path 27, and a flow path 28.

The current collector 21 is electrically connected to the power supply 40. The current collector 21 preferably contains a material having low chemical reactivity and high conductivity. Examples of this material include a metal material such as Ti or SUS, and carbon.

Figure 2:
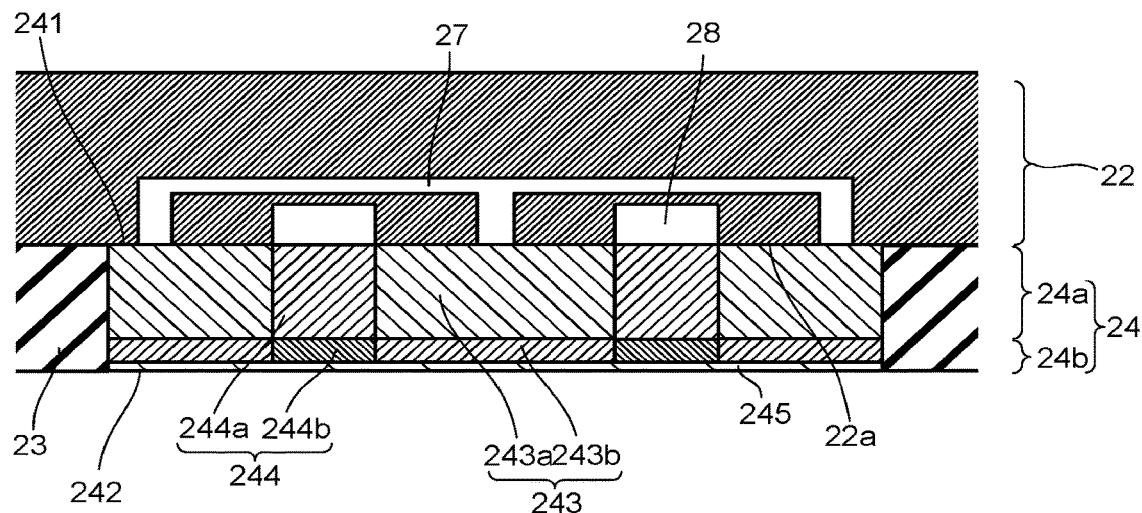
FIG. 2 is a schematic cross-sectional view illustrating a structure example of a cathode part.
Figure 3:
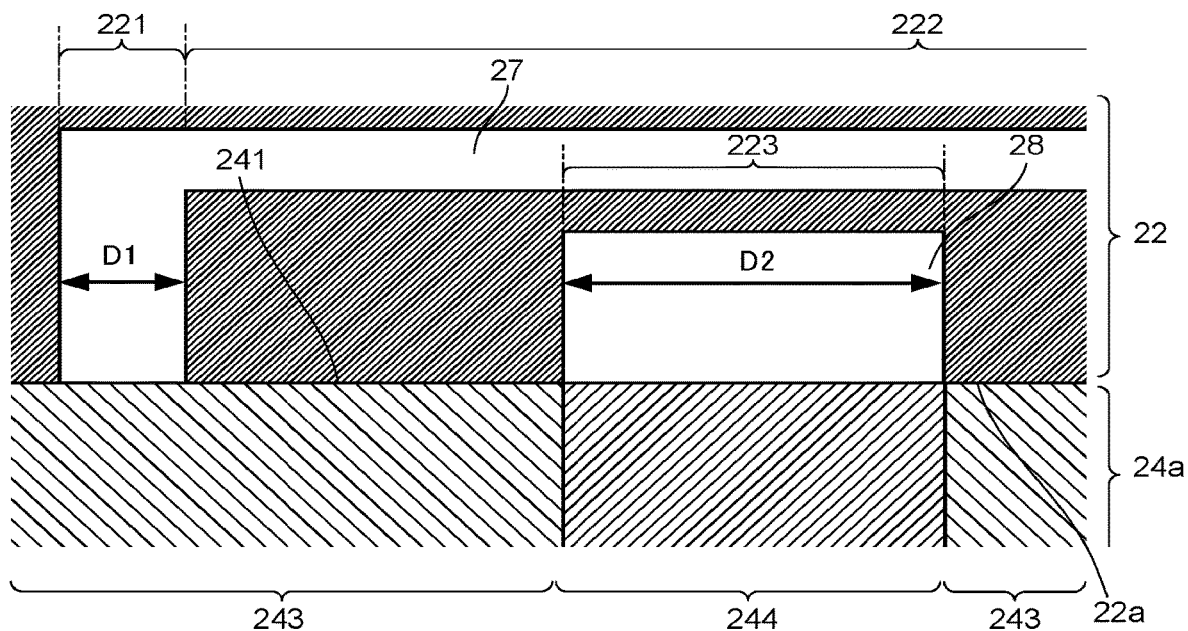
FIG. 3 is an enlarged view of part of the cathode part illustrated in FIG. 2.

FIG. 2 is a schematic cross-sectional view illustrating part of the cathode part 20, and FIG. 3 is an enlarged view of part of FIG. 2. The electric conductor 22 has a conductive surface 22a. The electric conductor 22 contains a conductive material having high corrosion resistance to water, for example. The electric conductor 22 contains the metal material such as Ti or SUS, carbon, or the like, for example.

The electric conductor 22 has a plurality of grooves 221, an opening 222 which connects one of the plurality of grooves 221 and another of the plurality of grooves 221, and a plurality of grooves 223. The groove 223 is disposed between one of the plurality of grooves 221 and another of the plurality of grooves 221. The opening 222 separates from and overlaps with the grooves 223. That is, the opening 222 and the grooves 223 three-dimensionally (sterically) cross each other.

Figure 4:
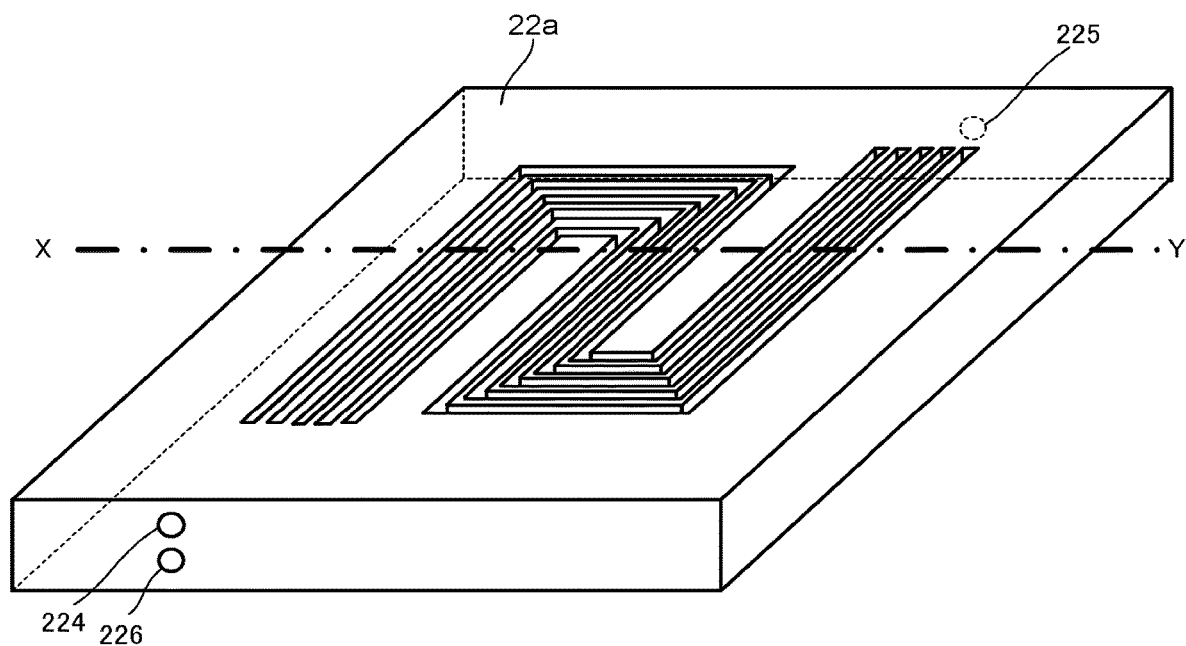
FIG. 4 is a schematic perspective view illustrating a structure example of an electric conductor.
Figure 5:
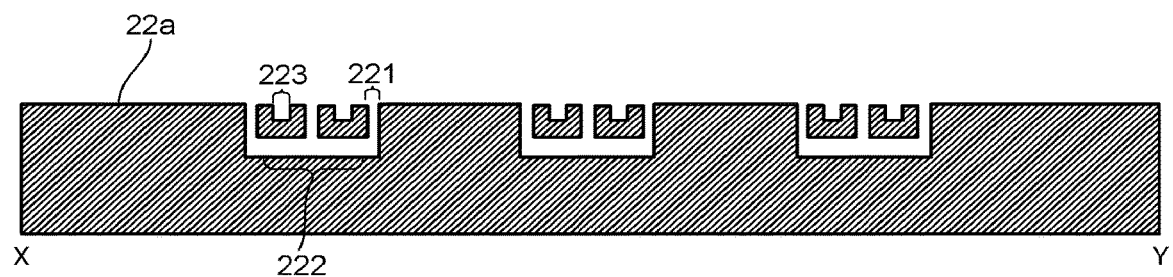
FIG. 5 is a schematic cross-sectional view taken along the X-Y line in FIG. 4.

FIG. 4 is a schematic perspective view illustrating a structure example of the electric conductor 22. FIG. 5 is a schematic cross-sectional view taken along the X-Y line of the electric conductor 22 illustrated in FIG. 4. In the electric conductors 22 illustrated in FIG. 4 and FIG. 5, at least one of the grooves 221, the opening 222, and the grooves 223 extends in a serpentine shape along the conductive surface 22a. Without limiting to this, at least one of the grooves 221, the opening 222, and the grooves 223 may extend in a comb shape or a spiral shape along the conductive surface 22a.

The grooves 221 and the opening 222 are connected to a discharge port 224 for discharging water to be made to flow in from the porous body 24 to the outside of the cathode part 20. The grooves 223 are connected to an inflow port 225 for making carbon dioxide flow into the porous body 24 from the outside of the cathode part 20 and an outflow port 226 for making carbon dioxide and a product flow out to the outside of the cathode part 20 from the porous body 24. The above-described inflow may be controlled by, for example, a flow rate controller or the like, and the outflow and the discharge may be controlled by, for example, a pump or the like.

The electric conductor 22 is preferably a metal plate containing a material having low chemical reactivity and high conductivity. Examples of this plate include a metal plate such as Ti or SUS. Because there is a need for the metal plates to sandwich the electrochemical reaction device at pressure sufficient to retain airtightness of liquid and gas in the electrochemical reaction device, the metal plate preferably has a thickness, according to its composition, in which the metal plate is not curved by the pressure. Further, at the time of sandwiching the above-described metal plate, holes are provided in the metal plate, through which screws are passed, and the screws are fastened with a nut to thereby retain the entire structure of a cell, and further it is preferable that an optimum tightening pressure for hermeticity and cell performance can be reproduced by tightening the above-described screws uniformly. It is preferable that screw holes are set to a number capable of reproducing the optimum tightening pressure for the hermeticity and the cell performance and in positions such as the periphery and the middle in a surface of the above-described metal plate.

The electric conductor 22 may be formed by a stack of a first metal plate and a second metal plate, for example. The first metal plate has a groove constituting the opening 222, and the second metal plate has the grooves 223 and openings passing through in the thickness direction and constituting the grooves 221. The openings of the second metal plate face the groove of the first metal plate. Thus, the grooves 221, the opening 222, and the grooves 223 are formed.

The grooves 221, the opening 222, and the grooves 223 may be formed by cutting part of the metal plates. This is effective when the metal plates are sufficiently thick. Alternatively, when the metal plates are thin, they may be formed by patterning by a mask and chemical etching. Regarding what method to select, it is preferable to select a method of keeping deformation of the metal plates due to a curve or the like at a minimum.

The grooves 221 and the grooves 223 may be formed by changing the depths to which the grooves are dug, for example. When they are formed by the chemical etching, they may be formed by changing the depths to which the metal plate is etched in two or more patterning steps. When the metal plate is not passed through, it is preferable that the grooves which do not pass through the metal plate are formed, for example, without changing the depths to which the grooves are dug. Alternatively, when they are formed by the chemical etching, it is preferable that the metal plate is etched in one patterning step and the grooves are formed to depths to which the metal plate is not passed through.

The support 23 has a function of supporting the porous body 24. The support 23 has an opening, for example, and the porous body 24 is disposed in the opening. Note that the opening of the support 23 may be connected to the outside of the support 23.

The porous body 24 constitutes at least part of the cathode. The porous body 24 has a function as a gas diffusion layer. The porous body 24 has a stack of a porous layer 24a having a surface 241 in contact with the conductive surface 22a and a porous layer 24b having a surface 242 on a side opposite to the surface 241. A porosity of the porous layer 24b is preferably different from a porosity of the porous layer 24a. The porous layer 24a is constituted by carbon paper, carbon cloth, or the like, for example. The porous layer 24b is constituted by a porous body whose pore size is smaller than that of carbon paper or carbon cloth, for example.

The porous layer 24a has a porous portion 243a facing the grooves 221 and a porous portion 244a facing the grooves 223. The porous layer 24b has a porous portion 243b in contact with the porous portion 243a and a porous portion 244b in contact with the porous portion 244a. That is, the porous body 24 has the porous portion 243 including the porous portion 243a and the porous portion 243b, and the porous portion 244 including the porous portion 244a and the porous portion 244b. The porous portion 243 is in contact with at least one of the surface 241 and the surface 242. The porous portion 244 is in contact with at least one of the surface 241 and the surface 242. The porous portions 243 and 244 have pore portions. At least part of the pore portions communicates from the surface 241 to the surface 242.

A contact angle A between an inner wall of the porous portion 244 and water is larger than a contact angle B between an inner wall of the porous portion 243 and water (A>B>90°). That is, the porous portion 244 has a hydrophobic property higher than that in the porous portion 243. Note that electric conductivity of the porous portion 243 is higher than electric conductivity of the porous portion 244 due to A>B.

Examples of a method of forming a contact angle distribution between the porous portion 243 and the porous portion 244 include a method of forming a hydrophobic film on a surface of the inner wall of the porous portion 244. The hydrophobic film may be formed by a method of applying Hydrophobic Fluoropolymer to a commercially available gas diffusion layer, covering with a mask, irradiating with an electron beam, and immersing in a Hydrophilic Monomer solution, for example. Examples of Hydrophobic Fluoropolymer include Fluorinated Ethylene Propylene, N-vinylformamide, and the like. The hydrophobic film may be formed by covering the porous portion 244 with a mask and applying a water repellent material through the mask. Examples of the water repellent material include Polytetrafluoroethylene (PTFE) and the like. The water repellent material may be applied by a spray injection.

The surface 242 includes a supported reduction catalyst 245. At this time, the reduction catalyst 245 may be regarded as a catalyst layer provided on the surface 242. The reduction catalyst 245 is provided to reduce carbon dioxide to product at least one of a carbon compound and hydrogen. The reduction catalyst 245 is preferably constituted of a catalyst material capable of decreasing overvoltage. Examples of this material include a metal such as gold (Au), silver (Ag), copper (Cu), platinum (Pt), palladium (Pd), nickel (Ni), cobalt (Co), iron (Fe), manganese (Mn), titanium (Ti), cadmium (Cd), zing (Zn), indium (In), gallium (Ga), lead (Pb), or tin (Sn), a metal material such as an alloy or an intermetallic compound containing at least one of the above metals, a carbon material such as carbon (C), graphene, CNT (carbon nanotube), fullerene, or ketjen black, and a metal complex such as a Ru complex or a Re complex. Various shapes such as a plate shape, a mesh shape, a wire shape, a particle shape, a porous shape, a thin film shape, and an island shape can be applied to the reduction catalyst 245.

The flow path plate 25 has an opening having a function as the flow path 26. The flow path 26 faces the reduction catalyst 245. The flow path 26 is provided to make an electrolytic solution containing at least water flow. Accordingly, the flow path 26 has a function as an electrolytic solution flow path. The flow path plate 25 preferably contains a material having low chemical reactivity and having no conductivity. Examples of this material include an insulating resin material such as an acrylic resin, polyetheretherketone (PEEK), or a fluorocarbon resin. Changing an amount of water and an electrolytic solution component which are contained in the electrolytic solution flowing through the flow path 26 makes it possible to change the oxidation-reduction reactivity and change the selectivity of the substances to be reduced, and the proportion of chemical substances to be produced.

The electrolytic solution is preferably a solution containing at least water ($H_2O$). Because carbon dioxide ($CO_2$) is supplied from the flow path 28, the electrolytic solution may contain or need not contain carbon dioxide ($CO_2$). To the electrolytic solution in the anode part 10 side and the electrolytic solution in the cathode part 20 side, the same solution may be applied or different solutions may be applied. Examples of a solution used as the electrolytic solution and containing water include an aqueous solution containing an arbitrary electrolyte. Examples of the aqueous solution include an aqueous solution containing at least one ion selected from a hydroxide ion ($OH^-$), a hydrogen ion ($H^+$), a potassium ion ($K^+$), a sodium ion ($Na^+$), a lithium ion ($Li^+$), a chloride ion ($Cl^-$), a bromide ion ($Br^-$), an iodide ion ($I^-$), a nitrate ion ($NO_3^-$), a sulfate ion ($SO_4^{2-}$), a phosphate ion ($PO_4^{2-}$), a borate ion ($BO_3^{3-}$), and a hydrogen carbonate ion ($HCO_3^-$). In order to reduce electrical resistance of the solution, an alkaline solution in which an electrolyte such as a potassium hydroxide or a sodium hydroxide is dissolved in high concentration is preferably used as the electrolytic solution.

For the electrolytic solution, an ionic liquid which is made of salts of cations such as imidazolium ions or pyridinium ions and anions such as $BF_4^-$ or $PF_6^-$ and which is in a liquid state in a wide temperature range, or its aqueous solution may be used. Other examples of electrolytic solution include an amine solution of ethanolamine, imidazole, and pyridine, and an aqueous solution thereof. As amine, any of primary amine, secondary amine, and tertiary amine may be used.

The flow path 27 faces the porous portion 243a. Therefore, the flow path 27 communicates with the pore portion of the inside of the porous portion 243. The flow path 27 is provided to discharge at least one of water or water vapor from the porous portion 243 to the outside of the cathode part 20. The flow path 27 has a function as a discharge channel.

The flow path 27 illustrated in FIG. 1 to FIG. 3 includes a space surrounded by the grooves 221, the opening 222, and the porous portion 243a. Note that the flow path 27 may be provided in other positions as long as it faces the porous portion 243a.

The flow path 28 faces the porous portion 244a. That is, the flow path 28 communicates with the pore portion of the inside of the porous portion 244a. The flow path 28 is provided to make carbon dioxide flow in the porous portion 244 from the outside of the cathode part 20 and make at least one of a carbon compound and hydrogen which are produced by a reduction reaction flow out to the outside of the cathode part 20 from the porous portion 244. Accordingly, the flow path 28 has a function as a fluid flow path. Note that changing a flow rate of the electrolytic solution to be supplied via the flow path 26 and a pressure of a substance to be reduced, such as carbon dioxide, which is introduced via the flow path 28, makes it possible to change flux of water passing through the porous body 24.

The flow path 28 illustrated in FIG. 1 to FIG. 3 includes a space surrounded by the groove 223 and the porous portion 244a. Accordingly, the flow path 28 separates from and overlaps with the flow path 27. That is, the flow path 28 and the flow path 27 three-dimensionally (sterically) cross each other. Note that the flow path 28 may be provided in other positions as long as it faces the porous portion 244a.

A minimum diameter D1 of the flow path 27 is preferably smaller than a minimum diameter D2 of the flow path 28. The minimum diameter D1 is a minimum width in a direction perpendicular to a lengthwise direction a lengthwise direction of the groove 221 in FIG. 4) of the flow path 27, for example. The minimum diameter D2 is a minimum width in a direction perpendicular to a lengthwise direction (a lengthwise direction of the groove 223 in FIG. 4) of the flow path 28, for example. When the minimum diameter D2 has the same value as that of the minimum diameter D1, the contact area between the conductive surface 22a and the porous body 24 decreases, and therefore there is a concern for an increase in electrical resistance between the electric conductor 22 and the porous body 24. Further, water easily accumulates in the vicinity of the contact portion between the electric conductor 22 and the porous body 24, and when the distance between the contact portion and the flow path 27 is long, the time until the water within the vicinity of the contact portion reaches the flow path 27 increases, resulting in requiring a longer drainage time, and there is a concern that the function of the flow path 27 cannot be sufficiently utilized.

At least one of the flow path 27 and the flow path 28 may extend in a serpentine shape, a comb shape, or a spiral shape along the conductive surface 22a. A cross-sectional shape in a lengthwise direction of at least one of the flow path 27 and the flow path 28 is not particularly limited as long as it is not a shape which causes turbulent flow to the flow of liquid and gas.

The separator 30 is constituted of an ion exchange membrane or the like capable of moving ions between the anode part 10 and the cathode part 20 and separating the anode part 10 and the cathode part 20. As the ion exchange membrane, for example, a cation exchange membrane such as Nafion or Flemion or an anion exchange membrane such as Neosepta or Selemion can be used. As described later, when an alkaline solution is used as the electrolytic solution and it is assumed that mainly hydroxide ions (OH⁻) move, the separator 30 is preferably constituted of the anion exchange membrane. However, other than the ion exchange membrane, a glass filter, a porous polymeric membrane, a porous insulator, or the like may also be applied to the separator 30 as long as they are a material capable of moving ions between the anode part 10 and the cathode part 20.

The power supply 40 is electrically connected to the anode part 10 and the cathode part 20. The power supply 40 and the anode part 10, and the power supply 40 and the cathode part 20 may be connected by, for example, wiring. The power supply 40 includes a power supply device such as a photoelectric conversion element, a system power supply, or a storage battery, or a conversion unit which converts renewable energy such as wind power, water power, geothermal power, or tidal power into electrical energy. For example, the photoelectric conversion element has a function of performing charge separation by the energy of light such as irradiated sunlight. Examples of the photoelectric conversion element include a pin-junction solar cell, a pn-junction solar cell, an amorphous silicon solar cell, a multijunction solar cell, a single crystal silicon solar cell, a polycrystalline silicon solar cell, a dye-sensitized solar cell, an organic thin-film solar cell, and the like.

Next, an operation of the electrochemical reaction device of the embodiment will be described. Here, a case of producing carbon monoxide (CO) as the carbon compound is mainly described, but the carbon compound as a reduction product of carbon dioxide is not limited to carbon monoxide. The carbon compound may be methane ($CH_4$), ethane ($C_2H_6$), ethylene ($C_2H_4$), methanol ($CH_3OH$), ethanol ($C_2H_5OH$), ethylene glycol ($C_2H_6O_2$), or the like as described above. The reduction product carbon monoxide may be further reduced to produce the organic compounds as described above. Further, as a reaction process by the electrochemical reaction device, a case of mainly producing hydrogen ions ($H^+$) and a case of mainly producing hydroxide ions ($OH^-$) are considered, but it is not limited to either of these reaction processes.

First, the reaction process in a case of mainly oxidizing water ($H_2O$) to produce hydrogen ions ($H^+$) is described. When an electric current is supplied from the power supply 40 between the anode part 10 and the cathode part 20, the oxidation reaction of water ($H_2O$) occurs in the anode part 10. Specifically, as indicated by the following (1) formula, $H_2O$ contained in the electrolytic solution is oxidized and oxygen ($O_2$) and hydrogen ions ($H^+$) are produced.

$$2H_2O \rightarrow 4H^+ + O_2 + 4e^-  \quad (1)$$

H⁺ produced in the anode part 10 moves through the electrolytic solution existing in the anode part 10, the separator 30, and the electrolytic solution in the flow path 26, and reaches the cathode part 20. The reduction reaction of carbon dioxide ($CO_2$) occurs by electrons ($e^-$) based on the electric current which is supplied from the power supply 40 to the cathode part 20 and H⁺ which moves to the cathode part 20. Specifically, as indicated by the following (2) formula, $CO_2$ supplied to the cathode part 20 is reduced and CO is produced.

$$2CO_2 + 4H^+ + 4e^- \rightarrow 2CO + 2H_2O \quad (2)$$

Next, the reaction process in a case of mainly reducing carbon dioxide ($CO_2$) to produce hydroxide ions ($OH^-$) is described. When an electric current is supplied from the power supply 40 between the anode part 10 and the cathode part 20, in the cathode part 20, as indicated by the following (3) formula, water ($H_2O$) and carbon dioxide ($CO_2$) are reduced and carbon monoxide (CO) and hydroxide ions ($OH^-$) are produced. The hydroxide ions ($OH^-$) diffuse to the anode part 10, and as indicated by the following (4) formula, the hydroxide ions ($OH^-$) are oxidized and oxygen ($O_2$) is produced.

$$2CO_2 + 2H_2O + 4e^- \rightarrow 2CO + 4OH^- \quad (3)$$

$$4OH^- \rightarrow 2H_2O + O_2 + 4e^- \quad (4)$$

In both the above-described reaction process in which hydrogen ions (H⁺) are mainly produced and the reaction process in which hydroxide ions (OH⁻) are mainly produced, oxygen ($O_2$) is produced in the anode part 10.

In a reduction reaction, as long as gas and liquid are not separated efficiently, the reduction catalyst submerges in water, lowering the reaction efficiency, causing what is called a "flooding phenomenon," for example. When a flow path through which water or the like flows and a flow path through which carbon dioxide or the like flows are formed by the same component, a gas supply deficiency and a delay in drainage in the vicinity of the contact surface between the conductive surface and the porous body occur, thereby causing the flooding phenomenon of the reduction catalyst, lowering the reaction efficiency. Even if the contact area between the conductive surface and the porous body is made small, problems of resistance and drainage delay remain.

In contrast to this, in the electrochemical reaction device of the embodiment, the flow path for making water and water vapor flow is provided, a hydrophilic porous portion and a hydrophobic porous portion are formed in the porous body, and water and water vapor inside the porous body are discharged efficiently outside the cathode part, thereby allowing the efficiency of the reduction reaction to be increased. Further, it is possible to make the contact area between the conductive surface and the porous body large.

A structure example of the cathode part 20 is not limited to the structures described with reference to FIG. 1 to FIG. 5. FIG. 6 to FIG. 11 are schematic cross-sectional views illustrating part of other structure examples of the cathode part 20. Note that at least part of the structures of the cathode part 20 illustrated in FIG. 1 to FIG. 11 may be appropriately combined with each other. Further, as descriptions of the other structure examples of the cathode part 20 illustrated in FIG. 6 to FIG. 11, the descriptions of the structures illustrated in FIG. 1 to FIG. 5 can be appropriately incorporated.

Figure 6:
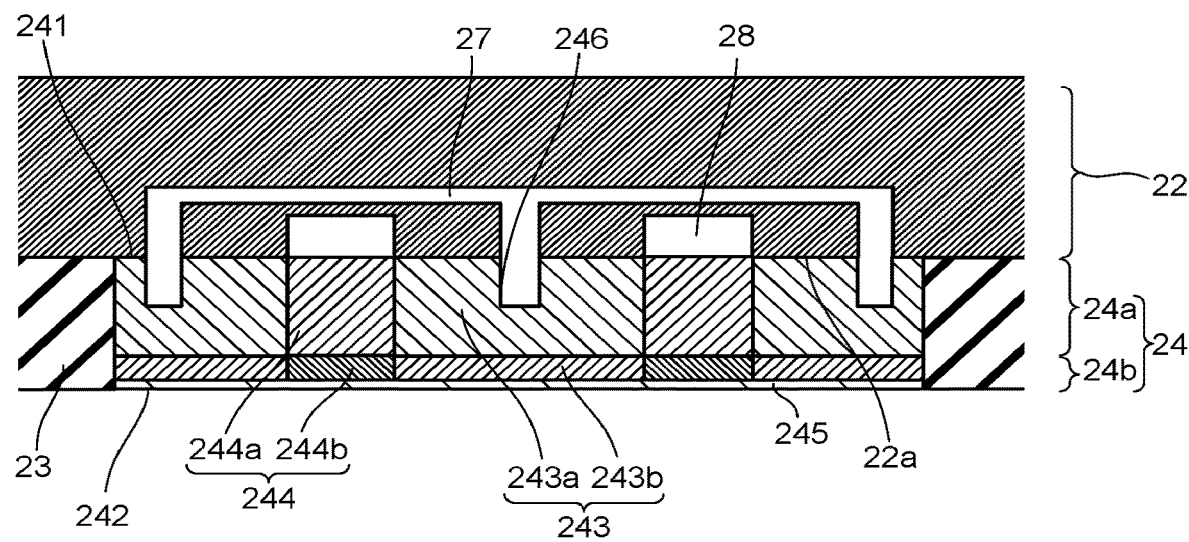
FIG. 6 is a schematic cross-sectional view illustrating another structure example of the cathode part.

The cathode part 20 illustrated in FIG. 6 is different compared with the structure illustrated in FIG. 2 in that the porous body 24 includes grooves 246 facing the grooves 221. The grooves 246 are provided in the porous portion 243, for example. The grooves 246 may extend in a serpentine shape, a comb-teeth shape, or a spiral shape along the grooves 221. In the structure illustrated in FIG. 6, the flow path 27 includes a space surrounded by the grooves 221, the opening 222, and the grooves 246.

Figure 7:
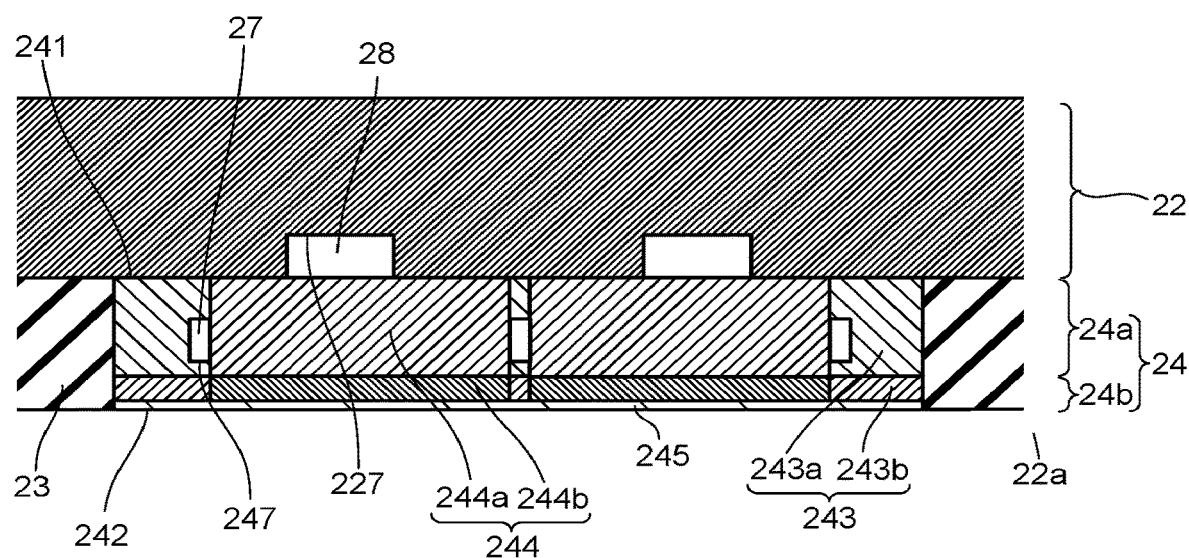
FIG. 7 is a schematic cross-sectional view illustrating another structure example of the cathode part.

The cathode part 20 illustrated in FIG. 7 is different compared with the structure illustrated in FIG. 2 in that positions of the porous portion 243 and the porous portion 244 are different from each other, the groove 221, the opening 222, and the groove 223 are not included, the electric conductor 22 includes grooves 227 facing the porous portion 244, and the porous body 24 includes openings 247 facing the porous portion 243. In the structure illustrated in FIG. 7, the flow path 27 includes a space surrounded by the opening 247, and the flow path 28 includes a space surrounded by the groove 227 and the porous portion 244. The openings 247 connect to the outside of the cathode part 20. At least one of the grooves 227 and the openings 247 may extend in a serpentine shape, a comb shape, or a spiral shape along the conductive surface 22a or the surface 241.

Figure 8:
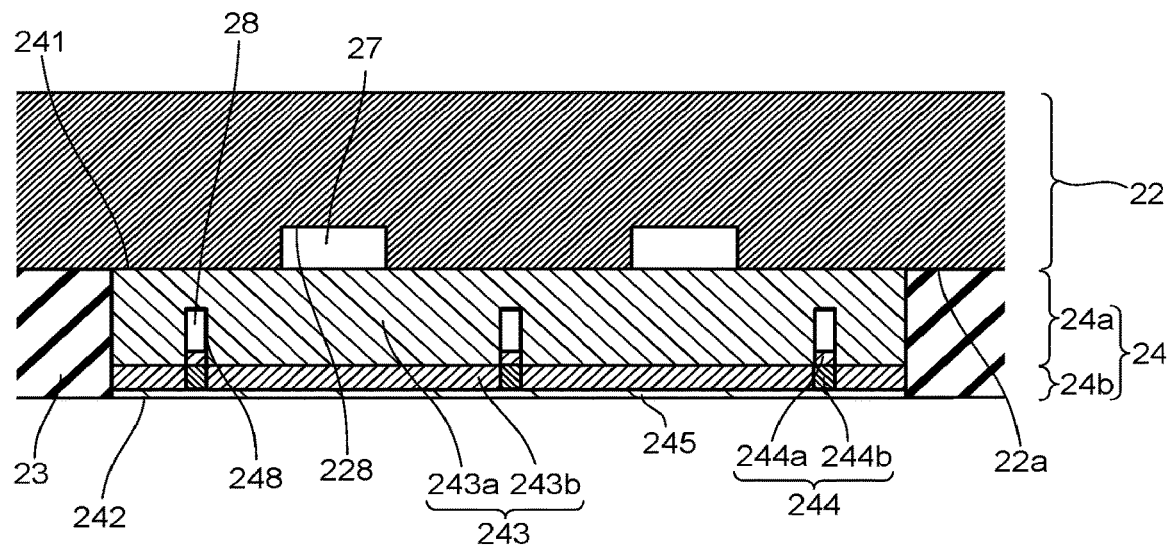
FIG. 8 is a schematic cross-sectional view illustrating another structure example of the cathode part.

The cathode part 20 illustrated in FIG. 8 is different compared with the structure illustrated in FIG. 2 in that the positions of the porous portion 243 and the porous portion 244 are different from each other, the groove 221, the opening 222, and the groove 223 are not included, the electric conductor 22 includes grooves 228 facing the porous portion 243, and the porous body 24 includes openings 248 facing the porous portion 244. The porous portion 243 is in contact with side surfaces of the porous body 24. The openings 248 connect to the outside of the cathode part 20. At least one of the grooves 228 and the openings 248 may extend in a serpentine shape, a comb shape, or a spiral shape along the conductive surface 22a or the surface 241. In the structure illustrated in FIG. 8, the flow path 27 includes a space surrounded by the groove 228 and the porous portion 243, and the flow path 28 includes a space surrounded by the opening 248.

Figure 9:
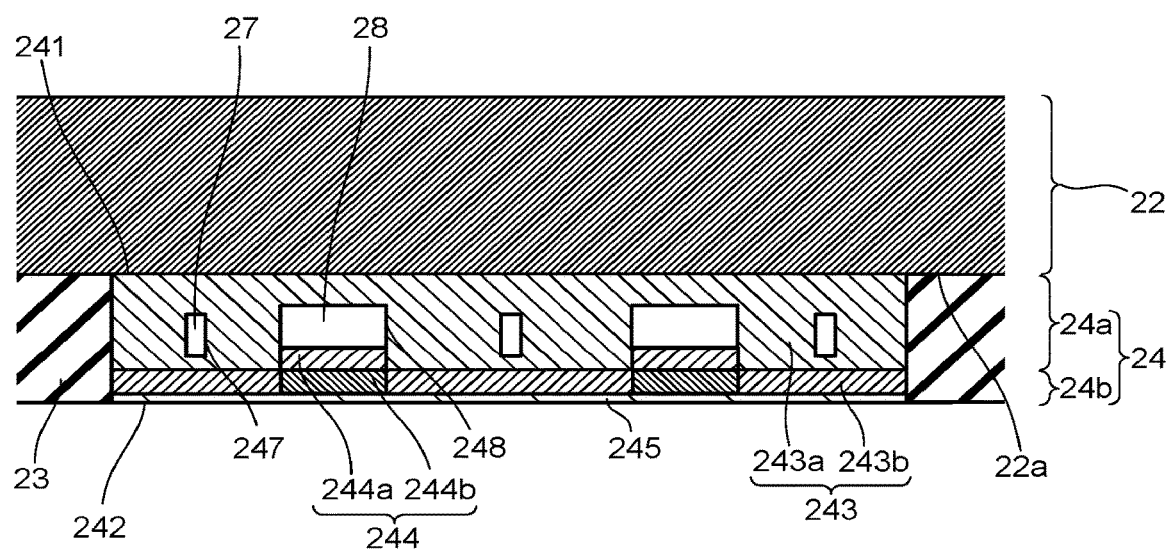
FIG. 9 is a schematic cross-sectional view illustrating another structure example of the cathode part.

The cathode part 20 illustrated in FIG. 9 is different compared with the structure illustrated in FIG. 2 in that the positions of the porous portion 243 and the porous portion 244 are different from each other, the groove 221, the opening 222, and the groove 223 are not included, and the porous body 24 includes the openings 247 facing the porous portion 243 and the openings 248 facing the porous portion 244. The openings 247 and the openings 248 connect to the outside of the cathode part 20. At least one of the openings 247 and the openings 248 may extend in a serpentine shape, a comb shape, or a spiral shape along the surface 241. In the structure illustrated in FIG. 9, the flow path 27 includes a space surrounded by the opening 247, and the flow path 28 includes a space surrounded by the opening 248.

Figure 10:
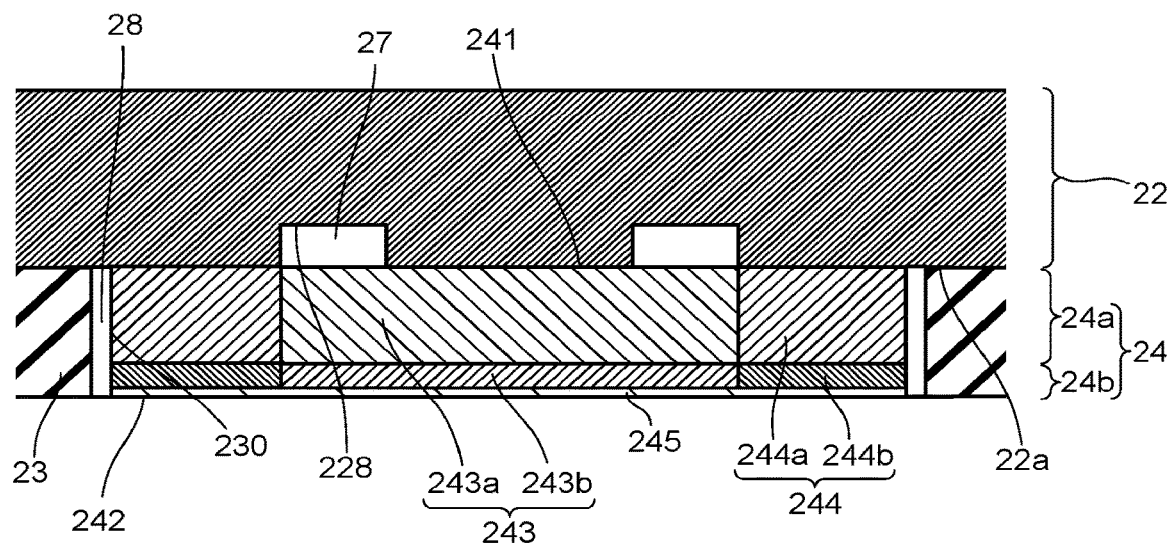
FIG. 10 is a schematic cross-sectional view illustrating another structure example of the cathode part.

The cathode part 20 illustrated in FIG. 10 is different compared with the structure illustrated in FIG. 2 in that the positions of the porous portion 243 and the porous portion 244 are different from each other, the groove 221, the opening 222, and the groove 223 are not included, the electric conductor 22 includes grooves 228 facing the porous portion 243, the porous portion 244 is in contact with side surfaces of the porous body 24, and pores 230 facing the porous portion 244 are included between the support 23 and the porous portion 244. The grooves 228 may extend in a serpentine shape, a comb shape, or a spiral shape along the conductive surface 22a. The pores 230 are connected to the outside of the cathode part 20, for example. In the structure illustrated in FIG. 10, the flow path 27 includes a space surrounded by the groove 228 and the porous portion 243, and the flow path 28 includes a space surrounded by the pore 230.

Figure 11:
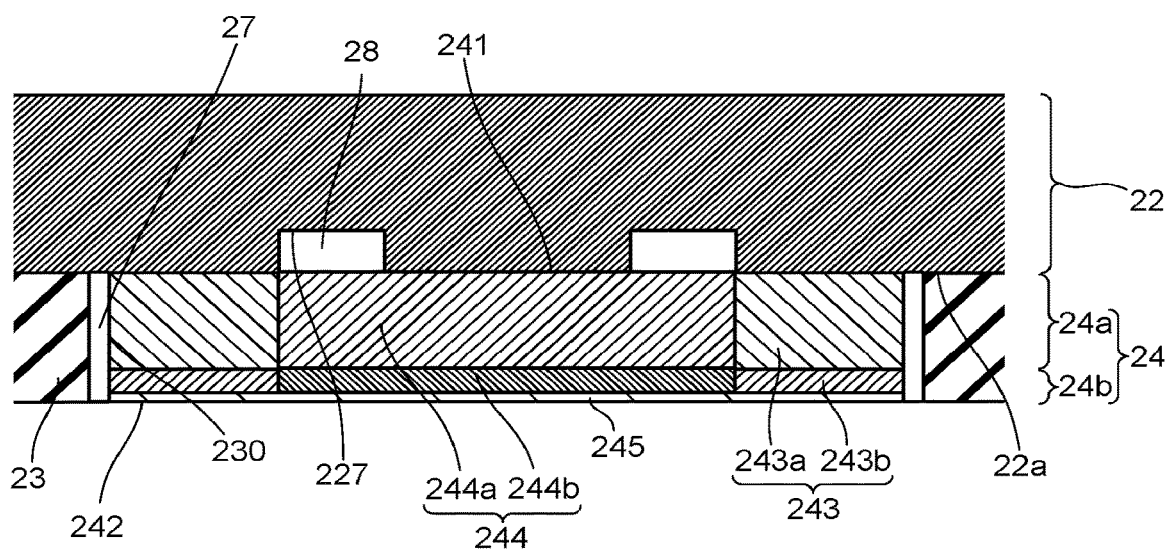
FIG. 11 is a schematic cross-sectional view illustrating another structure example of the cathode part.

The cathode part 20 illustrated in FIG. 11 is different compared with the structure illustrated in FIG. 2 in that the positions of the porous portion 243 and the porous portion 244 are different from each other, the groove 221, the opening 222, and the groove 223 are not included, the electric conductor 22 includes grooves 227 facing the porous portion 244, and the pores 230 facing the porous portion 243 are included between the support 23 and the porous portion 243. The grooves 227 may extend in a serpentine shape, a comb shape, or a spiral shape along the conductive surface 22a. The pores 230 are connected to the outside of the cathode part 20, for example. In the structure illustrated in FIG. 11, the flow path 27 includes a space surrounded by the pore 230, and the flow path 28 includes a space surrounded by the groove 227 and the porous portion 244.

EXAMPLES

Figure 12:
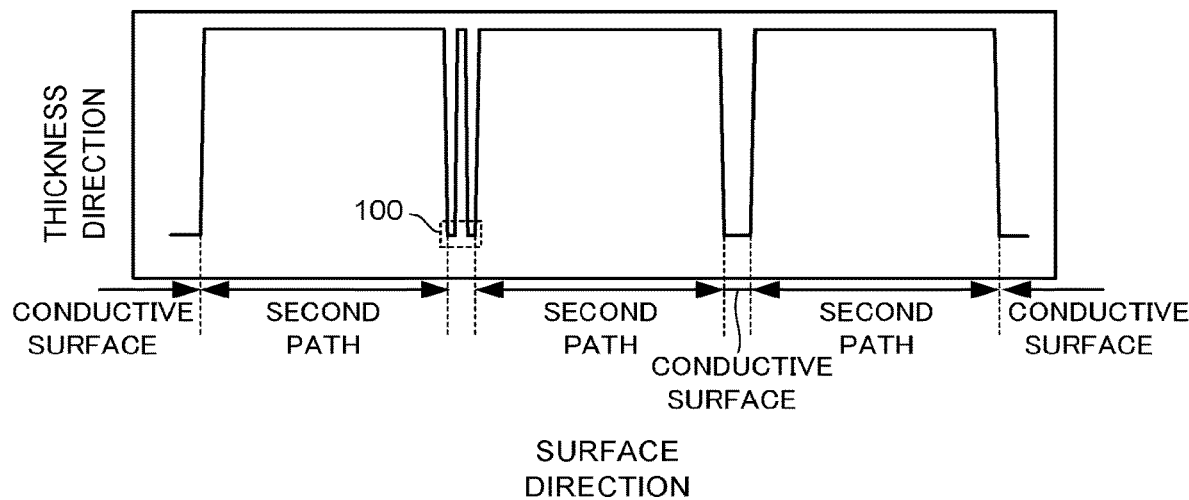
FIG. 12 is a view for explaining a structure model of a cathode part for simulation.
Figure 13:
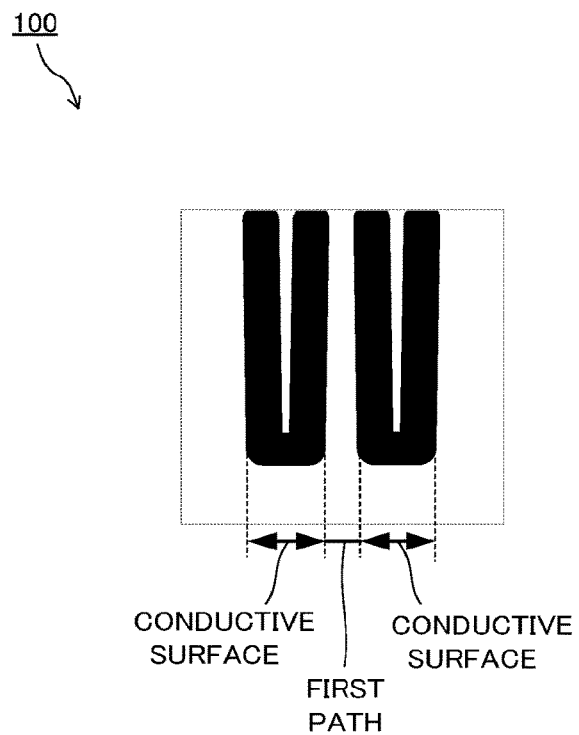
FIG. 13 is an enlarged view of a region 100 illustrated in FIG. 12.

In this embodiment, a simulation for evaluating drainage characteristics of the cathode part for the electrochemical reaction device was performed. FIG. 12 is a view for explaining a structure model of a cathode part for simulation. FIG. 13 is an enlarged view of a region 100 illustrated in FIG. 12. The horizontal axis represents the surface direction in a cross section of a model structure, and the vertical axis represents the thickness direction in the cross section of the model structure. The structure model of the cathode part includes an electric conductor having a conductive surface (CONDUCTIVE SURFACE), a porous body including a first porous portion and a second porous portion, a first flow path (FIRST PATH) facing the first porous portion, and a second flow path (SECOND PATH) facing the second porous portion, similar to the electrochemical reaction device of the above-described embodiment. The porous body is constituted by a stack of a first porous layer and a second porous layer. The first flow path is a flow path through which water flows, and the second flow path is a flow path through which gas such as carbon dioxide flows. Moreover, the above-described model structure has a region having the first flow path between a plurality of the second flow paths and a region not having the first flow path between the plurality of second flow paths as illustrated in FIG. 12.

Each parameter to be used for the simulation was set as follows. The thickness of the first porous layer was set to 300 μm. The thickness of the second porous layer was set to 30 μm. The density of water was set to 998 kg/m$^3$ at 20° C. The porosity of the first porous layer was set to 0.6. The porosity of the second porous layer was set to 0.4. The water permeability in the surface direction of the first porous layer was set to $1.5 \times 10^{-13}$ m$^2$. The water permeability in the thickness direction of the first porous layer was set to $1.5 \times 10^{-13}$ m$^2$. The water permeability in the surface direction of the second porous layer was set to $3 \times 10^{-14}$ m$^2$. The water permeability in the thickness direction of the second porous layer was set to $3 \times 10^{-14}$ m$^2$. The viscosity of water was set to $1 \times 10^{-3}$ Pa·s at 20° C. The surface tension in the contact surface between air and water was set to 0.0727 N/m at 20° C. The contact angle between an inner wall of the first porous portion of the first porous layer and water was set to 100 degrees. The contact angle between an inner wall of the second porous portion of the first porous layer and water was set to 110 degrees. The contact angle between an inner wall of the first porous portion of the second porous layer and water was set to 100 degrees. The contact angle between an inner wall of the second porous portion of the second porous layer and water was set to 110 degrees. The air pressure was set to 0 Pa. The operating current density was set to $2 \times 10^4$ A/m$^2$. The Faraday constant was set to 96485 C. The molecular weight of water was set to 0.018 kg/mol.

Example 1

Figure 14:
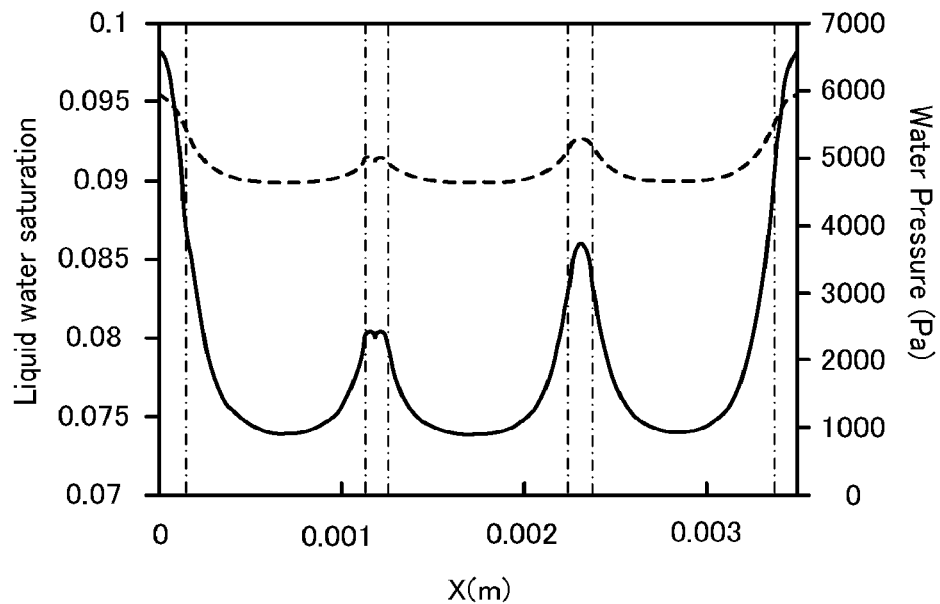
FIG. 14 is a chart illustrating a simulation result of drainage characteristics.

A simulation was performed in the above-described model structure having no contact angle distribution between the first porous portion and the second porous portion. FIG. 14 illustrates a simulation result of the drainage characteristics. The horizontal axis in FIG. 14 represents the position X in the surface direction in a cross section in the thickness direction of the model structure, and the vertical axis represents the water saturation degree or the water pressure distribution. Further, the dotted line is a curve indicating the relationship between the position X and the water pressure distribution, and the solid line is a curve indicating the relationship between the position X and the water saturation degree. As can be seen from FIG. 14, in the region having the first flow path, water was discharged via the first flow path and the pressure gradient became small, and the water saturation degree also became small. Water in the porous body flowed toward the side where water pressure was low, but providing the first flow path made the water pressure gradient in the vicinity of the conductive surface small, and reduced the amount of water flowing through the second flow path.

Example 2

Figure 15:
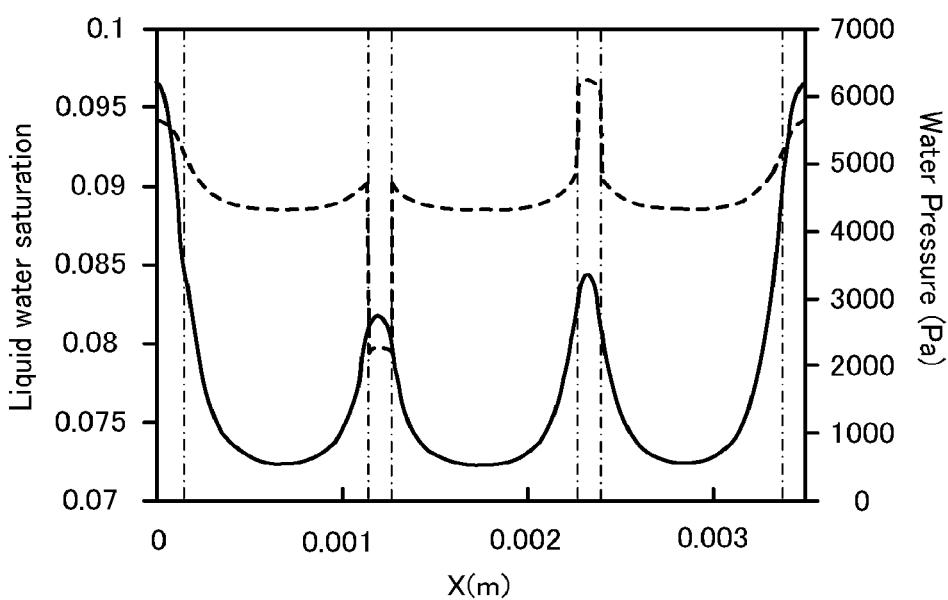
FIG. 15 is a chart illustrating a simulation result of the drainage characteristics.

A simulation was performed in the above-described model structure having the contact angle distribution between the first porous portion and the second porous portion. FIG. 15 illustrates a simulation result of the drainage characteristics. As can be seen from FIG. 15, providing the contact angle distribution greatly decreased water pressure in the first flow path, and therefore water easily flowed via the first flow path and the water saturation degree in the first flow path also became small.

Examples 3 to 5

Simulations were performed in the above-described model structure in which each of the second flow paths was made to extend in a serpentine shape (Example 3), a comb shape (Example 4), and a spiral shape (Example 5) along the conductive surface, and a minimum diameter of the first flow path was made smaller than a minimum diameter of the second flow path and no contact angle distribution was provided between the first porous portion and the second porous portion. FIG. 14 illustrates the simulation result of the drainage characteristics. As can be seen from FIG. 14, in the region having the first flow path, water was discharged via the first flow path and the pressure gradient became small, and the water saturation degree also became small. Water in the porous body flowed toward the side where the water pressure was low, but providing the first flow path made the water pressure gradient in the vicinity of the conductive surface small, and reduced the amount of water flowing through the second flow path.

Examples 6 to 8

Simulations were performed in the above-described model structure in which each of the second flow paths was made to extend in a serpentine shape (Example 6), a comb shape (Example 7), and a spiral shape (Example 8) along the conductive surface, and the minimum diameter of the first flow path was made smaller than the minimum diameter of the second flow path and the contact angle distribution between the first porous portion and the second porous portion was provided. FIG. 15 illustrates a simulation result of the drainage characteristics. As can be seen from FIG. 15, providing the contact angle distribution greatly decreased the water pressure in the first flow path, and therefore water easily flowed via the first flow path and the water saturation degree in the first flow path also became small.

Examples 9 to 11

Simulations were performed in the above-described model structure in which each of the first flow paths was made to extend in a serpentine shape (Example 9), a comb shape (Example 10), and a spiral shape (Example 11) along the conductive surface, and the minimum diameter of the first flow path was made smaller than the minimum diameter of the second flow path and no contact angle distribution between the first porous portion and the second porous portion was provided. FIG. 14 illustrates the simulation result of the drainage characteristics. As can be seen from FIG. 14, in the region having the first flow path, water was discharged via the first flow path and the pressure gradient became small, and the water saturation degree also became small. Water in the porous body flowed toward the side where the water pressure was low, but providing the first flow path made the water pressure gradient in the vicinity of the conductive surface small, and reduced an amount of water flowing through the second flow path.

Examples 12 to 14

Simulations were performed in the above-described model structure in which each of the first flow paths was made to extend in a serpentine shape (Example 12), a comb shape (Example 13), and a spiral shape (Example 14) along the conductive surface, and the minimum diameter of the first flow path was made smaller than the minimum diameter of the second flow path and the contact angle distribution between the first porous portion and the second porous portion was provided. FIG. 15 illustrates the simulation result of the drainage characteristics. As can be seen from FIG. 15, providing the contact angle distribution greatly decreased the water pressure in the first flow path, and therefore water easily flowed via the first flow path and the water saturation degree in the first flow path also became small.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device comprising:
an anode part to oxidize water and thus produce oxygen;
a cathode part to reduce carbon dioxide and thus produce a carbon compound and hydrogen; and
a separator separating the anode part and the cathode part,
wherein the cathode part comprises:
a conductor having a conductive surface;
a gas diffusion porous body including a first surface, a second surface, a first porous portion, and a second porous portion, the first surface being in contact with the conductive surface, the first porous portion being in contact with at least one of the first surface or the second surface, the second porous portion being in contact with at least one of the first surface or the second surface, and a contact angle between an inner wall of the second porous portion and the water being higher than a contact angle between an inner wall of the first porous portion and the water;
a reduction catalyst supported on the second surface and being directly in contact with the second surface to reduce carbon dioxide;
an electrolytic solution flow path facing the reduction catalyst and provided to make an electrolytic solution containing the water flow;
a first flow path facing the first porous portion and provided to discharge at least one of the water or water vapor from the first porous portion to an outside of the cathode part; and
a second flow path facing the second porous portion and provided to make the carbon dioxide flow in the second porous portion from the outside of the cathode part and make at least one of the carbon compound or the hydrogen flow out to the outside of the cathode part from the second porous portion,
wherein the first porous portion has a first region and a second region, the first region being disposed between the second porous portion and the second region, the first region overlapping the conductive surface and extending from the first surface to the second surface, and the second region overlapping the first flow path,
wherein the conductor has:
a plurality of first grooves facing the first porous portion;
an opening disposed inside the conductor and connecting one and another of the plurality of first grooves; and
a second groove disposed between the one and the other one of the plurality of first grooves, and facing the second porous portion,
wherein the gas diffusion porous body has a third groove facing the one or the other one of the plurality of first grooves,
wherein the third groove is disposed between the one or the other one of the plurality of first grooves and the first porous portion,
wherein the first flow path includes the plurality of first grooves, the opening, and the third groove, and
wherein the second flow path includes the second groove.

2. The device according to claim 1, wherein at least one of the plurality of first grooves and the second groove extends in a serpentine shape, a comb shape, or a spiral shape along the conductive surface.

3. The device according to claim 1,
wherein the gas diffusion porous body has:
a first porous layer having the first surface; and
a second porous layer stacked on the first porous layer and having the second surface, and
wherein a porosity of the second porous layer is different from a porosity of the first porous layer.

4. The device according to claim 1, wherein the carbon compound includes carbon monoxide.

5. The device according to claim 1, wherein each of the contact angles is larger than 90 degrees.

6. An electrochemical reaction device comprising:
an anode part to oxidize water and thus produce oxygen;
a cathode part to reduce carbon dioxide and thus produce a carbon compound and hydrogen; and
a separator separating the anode part and the cathode part,
wherein the cathode part comprises:
a conductor having a conductive surface;
a porous body including a first surface, a second surface, a first porous portion, and a second porous portion, the first surface being in contact with the conductive surface, the first porous portion being in contact with at least one of the first surface or the second surface, the second porous portion being in contact with at least one of the first surface or the second surface, and a contact angle between an inner wall of the second porous portion and the water being higher than a contact angle between an inner wall of the first porous portion and the water;
a reduction catalyst supported on the second surface and being directly in contact with the second surface to reduce carbon dioxide;
an electrolytic solution flow path facing the reduction catalyst and provided to make an electrolytic solution containing the water flow;

a first flow path facing the first porous portion and provided to discharge at least one of the water or water vapor from the first porous portion to an outside of the cathode part; and a second flow path facing the second porous portion and provided to make the carbon dioxide flow in the second porous portion from the outside of the cathode part and make at least one of the carbon compound or the hydrogen flow out to the outside of the cathode part from the second porous portion, wherein a minimum width of the first flow path is smaller than a minimum width of the second flow path, and wherein the first porous portion has a first region and a second region, the first region being disposed between the second porous portion and the second region, the first region overlapping the conductive surface and extending from the first surface to the second surface, and the second region overlapping the first flow path, wherein the conductor has:

a plurality of first grooves facing the first porous portion;

an opening disposed inside the conductor and connecting one and another of the plurality of first grooves; and a second groove disposed between the one and the other one of the plurality of first grooves, and facing the second porous portion, wherein the gas diffusion porous body has a third groove facing the one or the other one of the plurality of first grooves, wherein the third groove is disposed between the one or the other one of the plurality of first grooves and the first porous portion, wherein the first flow path includes the plurality of first grooves, the opening, and the third groove, and wherein the second flow path includes the second groove.

7. An electrochemical reaction device comprising:

an anode part to oxidize water and thus produce oxygen;

a cathode part to reduce carbon dioxide and thus produce a carbon compound and hydrogen; and a separator separating the anode part and the cathode part, wherein the cathode part comprises:

a conductor having a conductive surface;

a gas diffusion porous body including a first surface, a second surface, a first porous portion, and a second porous portion, the first surface being in contact with the conductive surface, the first porous portion being in contact with at least one of the first surface or the second surface, the second porous portion being in contact with at least one of the first surface or the second surface, and a contact angle between an inner wall of the second porous portion and the water being higher than a contact angle between an inner wall of the first porous portion and the water;

a reduction catalyst supported on the second surface and being directly in contact with the second surface to reduce carbon dioxide;

an electrolytic solution flow path facing the reduction catalyst and provided to make an electrolytic solution containing the water flow;

a first flow path facing the first porous portion and provided to discharge at least one of the water or water vapor from the first porous portion to an outside of the cathode part; and a second flow path facing the second porous portion and provided to make the carbon dioxide flow in the second porous portion from the outside of the cathode part and make at least one of the carbon compound or the hydrogen flow out to the outside of the cathode part from the second porous portion, wherein the second porous portion has a third region and a fourth region, the third region being disposed between the first porous portion and the fourth region, the third region overlapping the conductive surface and extending from the first surface to the second surface, and the fourth region overlapping the second flow path, wherein the conductor has:

a plurality of first grooves facing the first porous portion;

an opening disposed inside the conductor and connecting one and another of the plurality of first grooves; and a second groove disposed between the one and the other one of the plurality of first grooves, and facing the second porous portion, wherein the gas diffusion porous body has a third groove facing the one or the other one of the plurality of first grooves, wherein the third groove is disposed between the one or the other one of the plurality of first grooves and the first porous portion, wherein the first flow path includes the plurality of first grooves, the opening, and the third groove, and wherein the second flow path includes the second groove.

8. The device according to claim 7, wherein the third region is more hydrophobic than the first porous portion.

* * * * *